United States Patent
Neugebauer

[19]

[11] Patent Number: 6,095,120
[45] Date of Patent: Aug. 1, 2000

[54] FUEL INJECTION SYSTEM AND METHOD FOR AN AIR-COMPRESSING INTERNAL-COMBUSTION ENGINE

[75] Inventor: Stephan Neugebauer, Ohlstadt, Germany

[73] Assignee: Bayerische Motoren Werke Aktiengesellschaft, Munich, Germany

[21] Appl. No.: 09/168,873

[22] Filed: Oct. 9, 1998

[30] Foreign Application Priority Data

Oct. 9, 1997 [DE] Germany ............... 197 44 683

[51] Int. Cl.$^7$ ................... F02M 51/00
[52] U.S. Cl. ................... 123/478; 123/480
[58] Field of Search ................... 123/478, 480, 123/491

[56] References Cited

U.S. PATENT DOCUMENTS

| | | | |
|---|---|---|---|
| 4,756,292 | 7/1988 | Mischke et al. | 123/501 |
| 4,941,448 | 7/1990 | Nakaniwa et al. | 123/480 |
| 5,103,791 | 4/1992 | Tomisawa | 123/480 |
| 5,259,350 | 11/1993 | Toru et al. | 123/501 |
| 5,268,842 | 12/1993 | Marston et al. | 123/480 |
| 5,331,936 | 7/1994 | Messih et al. | 123/480 |
| 5,495,839 | 3/1996 | Samejima et al. | 123/480 |
| 5,584,277 | 12/1996 | Chen et al. | 123/492 |
| 5,634,448 | 6/1997 | Shinogle et al. | 123/480 |
| 5,896,845 | 4/1999 | Matsuda et al. | 123/480 |

FOREIGN PATENT DOCUMENTS

| | | |
|---|---|---|
| 0 742 362 | 11/1996 | European Pat. Off. . |
| 39 28 875 | 3/1991 | Germany . |
| 40 31 367 | 4/1992 | Germany . |
| 44 25 295 | 1/1996 | Germany . |
| 195 26 516 | 2/1996 | Germany . |

Primary Examiner—John Kwon
Attorney, Agent, or Firm—Evenson, McKeown, Edwards & Lenahan, P.L.L.C.

[57] ABSTRACT

A fuel injection system for an air-compressing, particularly supercharged internal-combustion engine, has an electronic control unit for determining the injection quantity for a quantity adjusting mechanism. The fuel injection system has an electronically controlled or regulated injection timing device for changing the start of the injection in each case as a function of the operating point of the internal-combustion engine. The start of the injection is, in addition, corrected as a function of the running time after the start of the internal-combustion engine.

8 Claims, 3 Drawing Sheets

FUEL INJECTION SYSTEM AND METHOD FOR AN AIR-COMPRESSING INTERNAL-COMBUSTION ENGINE

BACKGROUND AND SUMMARY OF THE INVENTION

This application claims the priority of German patent application 19744683, filed Oct. 9, 1997.

The invention relates to a fuel injection system for an air-compressing internal-combustion engine, particularly a supercharged engine, having an electronic control unit for a quantity adjusting mechanism for determining the injection quantity and having an electronically controlled or regulated injection timing device for changing the start of the injection in each case as a function of the operating point of the internal-combustion engine.

A fuel injection system of for a diesel internal-combustion engine is known, for example, from Schoenfelder et al., U.S. Pat. No. 5,520,152 (counterpart of German Patent Document DE 44 25 295 A1). In this known fuel injection system, a change of the injection start takes place in the form of an injection start correction as a function of the change of the rotational speed of the internal-combustion engine.

Concerning the surrounding technical field, reference is also made to German Patent Document DE 39 28 875 A1.

In the case of air-compressing internal-combustion engines, that is, particularly in the case of diesel internal-combustion engines, the fuel injection takes place while taking into account input quantities, specifically as a function of the respective engine operating point, which is generally set by means of a desired load generator, for example, in the case of motor vehicles, by means of an accelerator pedal. In this case, the desired load generator normally acts upon the quantity adjusting mechanism by means of which the injection quantity is defined, while an electronically controlled or regulated injection timing device defines the start of the injection, that is, the point in time of the fuel injection, particularly while taking into account the respective desired injection quantity.

However, in the case of previous determinations of the injection start for air-compressing internal-combustion engines, thermal conditions of the combustion space have not been taken into account. This results in disadvantages, not only with respect to the generation of noise but also with respect to emissions of the internal-combustion engine, particularly if the internal-combustion engine is intended for driving a motor vehicle.

It is an object of the invention to adapt the start of the injection to thermal conditions of the combustion space.

These and other objects have been achieved according to the present invention by providing a fuel injection system for an air-compressing internal-combustion engine, comprising: an electronic control unit for determining an injection quantity for a fuel quantity adjusting device; and an electronically controlled or regulated injection timing device for changing a starting time of a fuel injection as a function of at least one operating parameter of the internal-combustion engine, wherein the injection starting time is corrected as a function of an elapsed running time after starting of the internal-combustion engine.

These and other objects have been achieved according to the present invention by providing a fuel injection system for an internal-combustion engine, comprising: a fuel injector; a fuel injection timing device; a fuel quantity adjusting device; and an electronic control unit controlling said fuel injection timing device and said fuel quantity adjusting device to determine a desired starting time as a function of an elapsed running time after starting of the internal-combustion engine.

These and other objects have also been achieved according to the present invention by providing a fuel injection method for an internal-combustion engine including a fuel injector, a fuel injection timing device, and a fuel quantity adjusting device, said method comprising the act of controlling said fuel injection timing device and said fuel quantity adjusting device to determine a desired starting time as a function of an elapsed running time after starting of the internal-combustion engine.

These and other objects have also been achieved according to the present invention by providing a fuel injection method for an internal-combustion engine, said method comprising the acts of: sensing when the internal-combustion engine is started; determining a standard injection start value; determining an injection start correction value as a function of an elapsed running time after the internal-combustion engine was started; and determining an actual desired injection starting time as said standard injection start value minus said injection start correction value.

According to the invention, the start of the injection is corrected as a function of the elapsed running time after the start of the internal-combustion engine.

However, preferably, the start of the injection is corrected not only as a function of the running time of the internal-combustion engine but also as a function of the coolant temperature.

Although the injection start correction can take place exclusively on the basis of the coolant temperature, it cannot be differentiated on the basis of the coolant temperature alone whether the internal-combustion engine was just started or has been in operation for a longer period of time. However, with respect to the temperature level in the combustion space, this information is of considerable importance because, even if the coolant temperature is the same, clearly different thermodynamic conditions of the combustion occur for the two cases, for the purpose of which different injection starts are desirable.

It is recommended to integrate the injection start correction, which in particular results in a late adjustment of the injection start, by means of the superimposition of characteristic correction diagrams, into the normal electronic control unit which already exists. This minimizes the implementation expenditures.

Other objects, advantages and novel features of the present invention will become apparent from the following detailed description of the invention when considered in conjunction with the accompanying drawings.

DETAILED DESCRIPTION OF THE DRAWINGS

Figure 1:
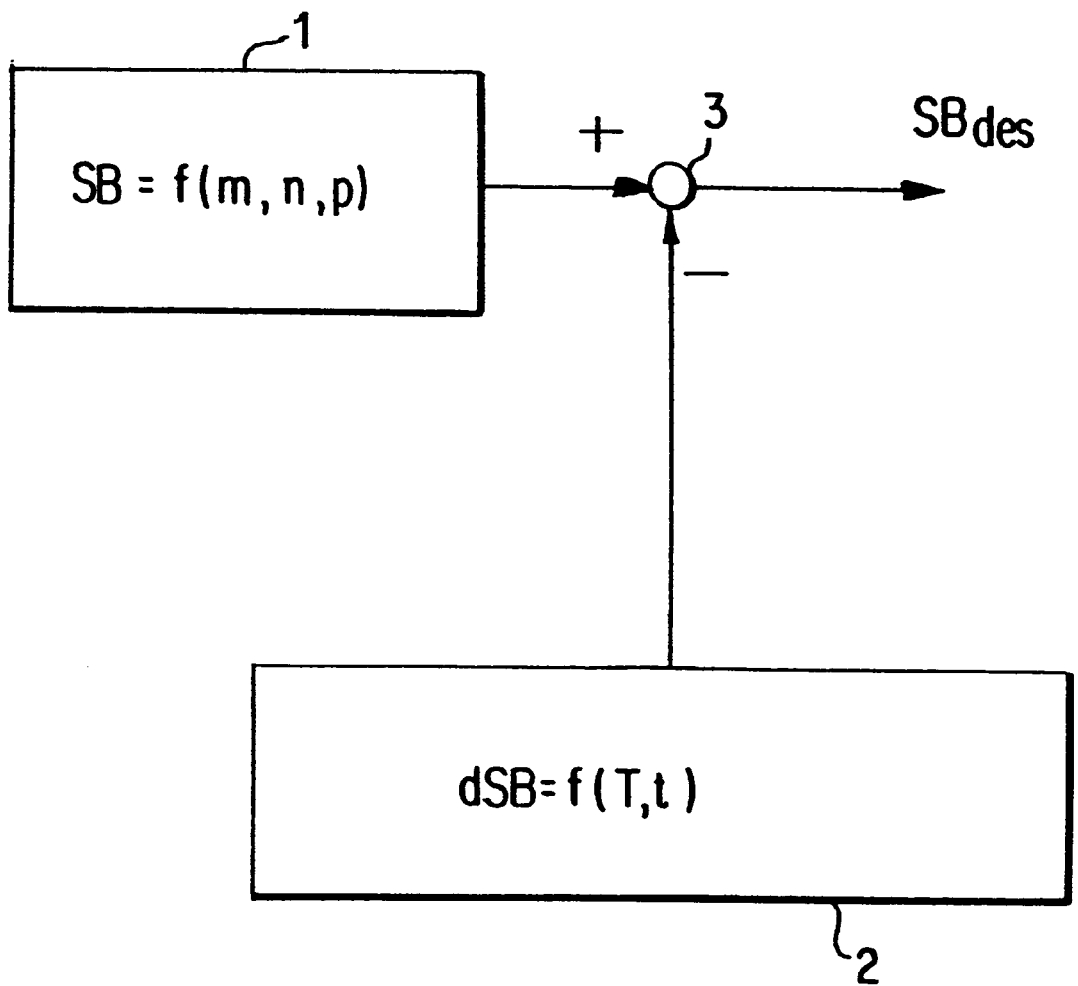
FIG. 1 shows a basic design of a software functional diagram for implementing the fuel injection system and method of the present invention.

FIG. 1 illustrates a characteristic operating point diagram 1 and a characteristic correction diagram 2. The standard injection start value SB of the characteristic operating point diagram 1 is the start of the injection as a function of the operating parameters of the internal-combustion engine, particularly as a function of actual input quantities, such as the fuel mass m, the engine rotational speed n and the charge pressure p. The output quantity dSB of the characteristic correction diagram 2 is the injection start correction value as a function of the coolant temperature T and of the running time t of the internal-combustion engine, beginning with each start. The injection start correction value dSB is added in the addition point 3 as an injection start late adjustment and therefore subtractively with respect to the normal injection start SB which was determined corresponding to the method of calculation previously customary. The output quantity of this addition point 3 is the actual desired value $SB_{des}$ for the actual injection start, taking into account the thermal injection start correction according to the invention, particularly the injection start late adjustment.

Naturally, an injection start correction according to the invention can be implemented, for example, in conjunction with a digital diesel engine regulating also in a different manner. The described advantages, particularly with respect to the emissions and the noise level, are achieved in all cases.

Figure 2:
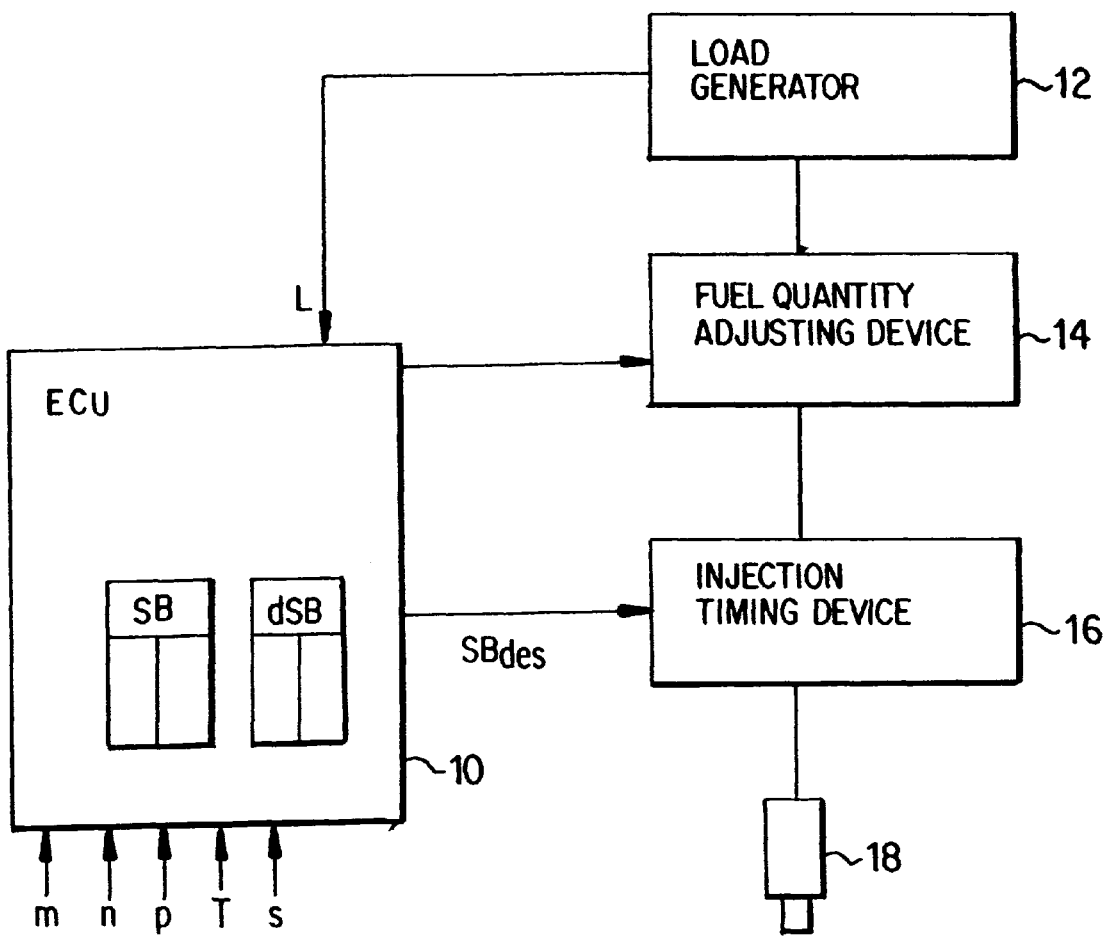
FIG. 2 shows a schematic view of a fuel injection system according to a preferred embodiment of the present invention.

Referring to FIG. 2, a conventional engine electronic control unit 10 receives signals regarding operating parameters of the engine, for example the fuel mass m, the engine rotational speed n, the charge pressure p, the coolant temperature T, as well as a start signal s (upon starting of the engine). A load generator 12, for example an accelerator pedal, acts upon a fuel quantity adjusting device 14, which is controlled by the electronic control unit 10. A load signal L is communicated from the load generator 12 to the electronic control unit 10. An injection timing device 16 controls the fuel injection timing (i.e., the start and stop of the fuel injection) for a fuel injector 18, based on the signal $SB_{des}$ received from the electronic control unit 10. The electronic control unit 10 determines the standard injection start value SB as a function of the operating parameters m, n, and p, for example according to a look-up table stored in memory in the electronic control unit 10, or based on a characteristic curve or equation stored in memory in the electronic control unit 10. The electronic control unit 10 determines the injection start correction value dSB as a function of the coolant temperature T and of the elapsed running time t since starting the internal-combustion engine, for example according to a look-up table or based on a characteristic curve or equation. The desired value $SB_{des}$ for the actual injection start is determined by subtracting the injection start correction value dSB from standard injection start value SB, with the desired injection start value $SB_{des}$ being communicated to the injection timing device 16.

Figure 3:
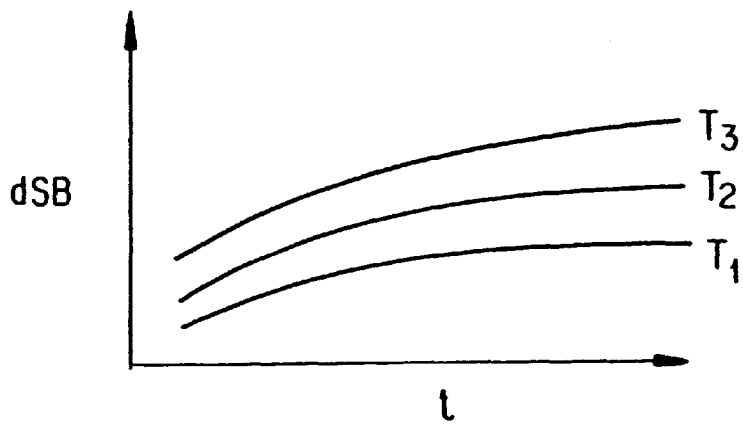
FIG. 3 shows a schematic characteristic curve diagram for determining the injection start correction value dSB.

FIG. 3 schematically represents three characteristic curves for the injection start correction value dSB as a function of the elapsed running time t since starting of the engine, for three different coolant temperatures $T_1$, $T_2$, $T_3$.

Figure 4:
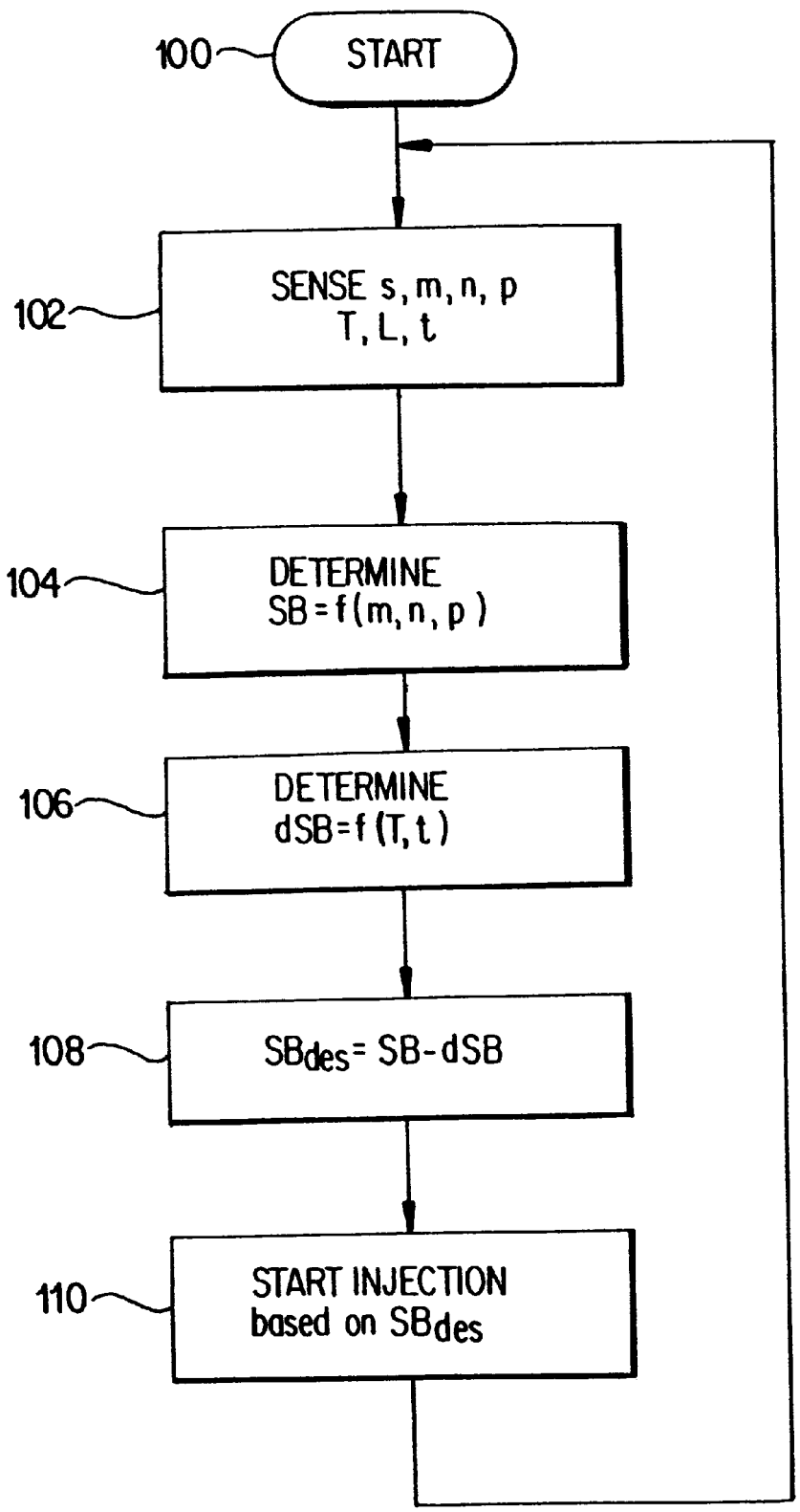
FIG. 4 shows a flowchart of a fuel injection method according to a preferred embodiment of the present invention.

FIG. 4 shows the method of controlling fuel injection according to the invention. In step 100, the method is started. In step 102, various operating parameters are sensed, including the start signal s (time of starting the engine), the fuel mass m, the engine rotational speed n, the charge pressure p, the coolant temperature T, the load generator signal L, and the elapsed time t since starting of the engine. In step 104, the standard injection start value SB is determined as a function of the operating parameters m, n, and p, for example according to a look-up table or based on a characteristic curve or equation. In step 106, the injection start correction value dSB is determined as a function of the coolant temperature T and of the elapsed running time t since starting the internal-combustion engine, for example according to a look-up table or based on a characteristic curve or equation. In step 108, the desired value $SB_{des}$ for the actual injection start is determined by subtracting the injection start correction value dSB from standard injection start value SB. In step 110, the fuel injection is started based on the desired injection start value $SB_{des}$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel injection system for an air-compressing internal-combustion engine, comprising:

an electronic control unit for determining an injection quantity for a fuel quantity adjusting device; and an electronically controlled or regulated injection timing device including a first unit for providing an initial starting time of a fuel injection as a function of at least one of a fuel mass, a rotational speed of the engine, and a charge pressure of the internal-combustion engine and a second unit for providing an adjustment value to modify said initial starting time wherein the adjustment value is determined as a function of an elapsed running time after starting of the internal-combustion engine.

2. A fuel injection system according to claim 1, wherein the modification of the injection starting time takes place by superimposition of characteristic correction diagrams in the electronic control unit.

3. A fuel injection system for an internal-combustion engine, comprising:

a fuel injector;

a fuel injection timing device;

a fuel quantity adjusting device; and an electronic control unit controlling said fuel injection timing device and said fuel quantity adjusting device to determine a desired starting time, wherein said desired starting time consists of a standard injection start value determined as a function of at least one operating parameter of the internal-combustion engine minus an injection start correction value determined as a function of an engine coolant temperature and of an elapsed running time after starting of the internal-combustion engine.

4. A fuel injection system according to claim 3, wherein said at least one operating parameter consists of at least one of a fuel mass, a rotational speed of the engine, and a charge pressure.

5. A fuel injection method for an internal-combustion engine including a fuel injector, a fuel injection timing device, and a fuel quantity adjusting device, said method comprising the act of controlling said fuel injection timing device and said fuel quantity adjusting device to determine a desired starting time, wherein said desired starting time consists of a standard injection start value determined as a function of at least one operating parameter of the internal-combustion engine minus an injection start correction value determined as a function of an engine coolant temperature and of the elapsed running time.

6. A fuel injection method according to claim 5, wherein said at least one operating parameter consists of at least one of a fuel mass, a rotational speed of the engine, and a charge pressure.

7. A fuel injection method for an internal-combustion engine, said method comprising the acts of:

sensing when the internal-combustion engine is started;

determining a standard injection start value as a function of at least one of a fuel mass, a rotational speed of the engine and a charge pressure of the internal combustion engine;

determining an injection start correction value as a function of an elapsed running time after the internal-combustion engine was started; and determining an actual desired injection starting time as said standard injection start value minus said injection start correction value.

8. A fuel injection method according to claim 7, wherein said injection start correction value is further determined as a function of an engine coolant temperature.

* * * * *